Figure 1:
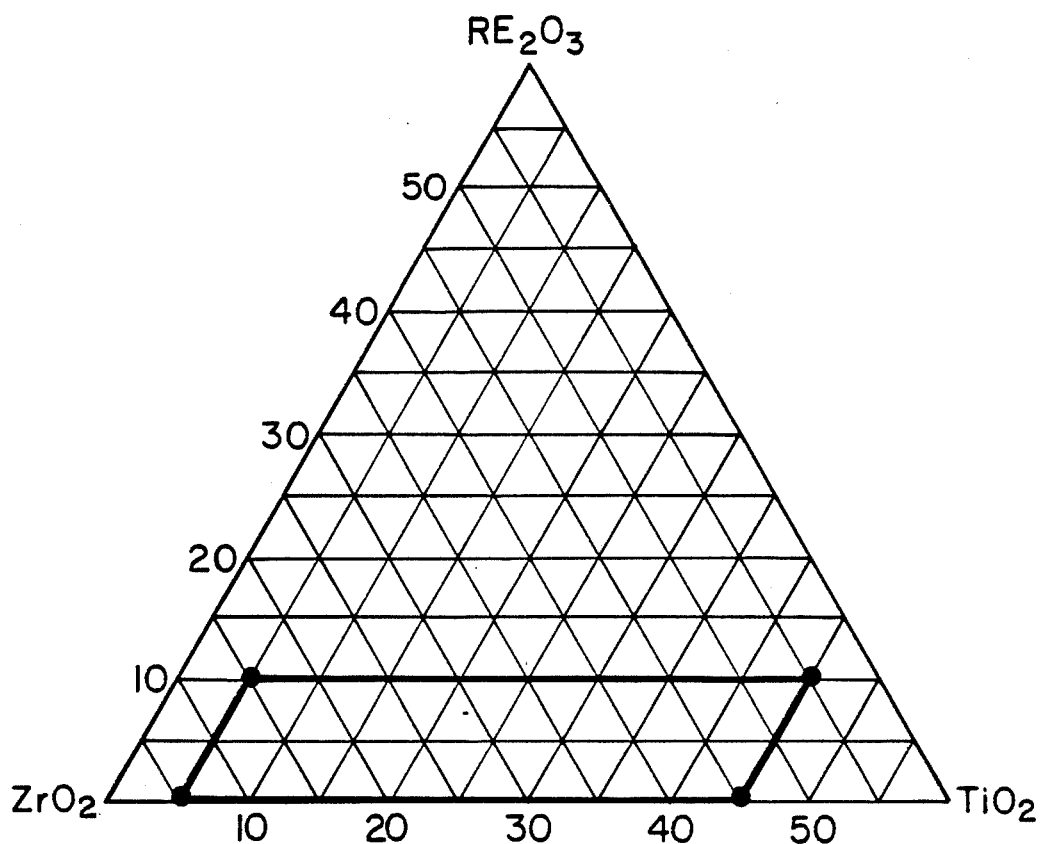

United States Patent [19]

Ketcham

[11] Patent Number: 4,753,902

[45] Date of Patent: Jun. 28, 1988

[54] TRANSFORMATION TOUGHENED ZIRCONIA-TITANIA-YTTRIA CERAMIC ALLOYS

[75] Inventor: Thomas D. Ketcham, Big Flats, N.Y.

[73] Assignee: Corning Glass Works, Corning, N.Y.

[21] Appl. No.: 934,154

[22] Filed: Nov. 24, 1986

[51] Int. Cl.$^4$ ............... C04B 35/48; C04B 35/50; C04B 35/80
[52] U.S. Cl. ..................... 501/87; 501/88; 501/96; 501/97; 501/98; 501/103; 501/106; 501/127; 501/128
[58] Field of Search ............ 501/103, 92, 87, 88, 501/96, 97, 98, 127, 128, 106

[56] References Cited

U.S. PATENT DOCUMENTS

| | | | |
|---|---|---|---|
| 4,543,345 | 9/1985 | Wei | 501/92 |
| 4,598,053 | 7/1986 | Yamakawa et al. | 501/103 |
| 4,645,716 | 2/1987 | Harrington et al. | 501/103 |

Primary Examiner—Mark L. Bell
Attorney, Agent, or Firm—Clinton S. Janes, Jr.

[57] ABSTRACT

This invention is directed to the production of ceramic alloys consisting essentially of $ZrO_2$, titania, and yttria or rare earth oxides such as gadolinia, ytterbia, neodymia, and ceria. Mole % concentration values as low as 0.25 mole % for yttria have been found to provide a hard and tough ceramic alloy in the presence of the titania-zirconia body. These compositions have been found to produce effective hard and tough ceramic bodies when mixed with refractory fibers and/or whiskers and hard refractory ceramics.

14 Claims, 3 Drawing Sheets

TRANSFORMATION TOUGHENED ZIRCONIA-TITANIA-YTTRIA CERAMIC ALLOYS

BACKGROUND OF THE INVENTION

Transformation toughened zirconia is associated with volume expansion which results from the tetragonal to monoclinic crystal phase transition. The transformation equilibrium is a function of several variables such as temperature, the presence of stabilizer additives, and grain size.

Due to the sensitivity of pure zirconia transformations to temperature changes, stabilizer additives have been incorporated into zirconia to suppress undesirable and uncontrollable tetragonal to monoclinic transformations. Such additives favor a particular phase, effectively arresting the transformation equilibrium at a point where the crystal phase exhibits properties most advantageous for a desired structure. Transformation toughened, tetragonal, partially-stabilized zirconia, and ceramic matrix materials toughened by tetragonal, partially-stabilized zirconia have been found useful where excellent thermal conductivity, hardness, and toughness properties are required; such as in wear/abrasion resistant ceramics, thermal shock resistant ceramics, cutting tools, draw dies, ceramic bearings, and oxygen ion conductors.

Heretofore, the focus of stabilizer additive use has been to add a particular oxide dopant to the zirconia to arrest the transformation equilibrium reaction at a particular stage of its development. As a result, exotic and costly additives at moderate concentrations such as yttria, ceria, and combinations of other rare earth oxides have been mixed with relatively rare zirconia to produce a material with highly desirable properties. For example:

U.S. Pat. No. 4,565,792 discloses a stabilized zirconia doped with yttria, stating that a minimum of 1.7 mole percent yttria is needed for stabilization. U.S. Pat. No. 4,520,114 discloses the utility of a 1–30 mole percent mixture of alkaline earth and yttrium metal oxide for necessary stabilization. U.S. Pat. No. 4,430,440 discloses an alumina, titania, yttria, zirconia composition; however, the small amount of zirconia present precludes its consideration as a zirconia based alloy system.

In the abstracts from the Zirconia 1986 meeting held in Tokyo, September, 1986, K. Tsukuma et al. "Transparent Titania-Yttria-Zirconia Ceramics", discuss the use of the single composition of 90 mole % ($ZrO_2$-8 mole % $Y_2O_3$) / 10 mole % $TiO_2$ for its optical properties. This composition has a cubic structure with grain sizes from 25 to 150 microns.

From this same meeting, C. Bateman et al. discuss in their abstract "Phase Equilibria and Phase Transformations in $ZrO_2$-$TiO_2$ and $ZrO_2$-MgO-$TiO_2$ Systems", four compositions; $ZrO_2$-15 mole % $TiO_2$; $ZrO_2$-28 mole % $TiO_2$; 95 mole % ($ZrO_2$-13 mole % MgO) / 5 mole % $TiO_2$ and 80 mole % ($ZrO_2$-13 mole % MgO) / 20 mole % $TiO_2$. Bateman et al. state that the two zirconia titania compositions were monoclinic at room temperature after sintering at 1400° C. for one hour. They found that the zirconia-13 mole % magnesia-20 mole % titania sample was predominantly in cubic and monoclinic phases at room temperature with some $MgTi_2O_5$ phase present. Nowhere was the substitution or addition of $Y_2O_3$ discussed.

Herein is disclosed for purposes of initiating stabilization, a minimum of 0.25 mole percent yttria where zirconia is mixed with titania as a stabilizing aid. This novel mixture provides a transformation toughened material with attractive toughness and hardness properties, yet significantly decreases the required amount of yttria and zirconia.

SUMMARY OF THE INVENTION

Figure 2:
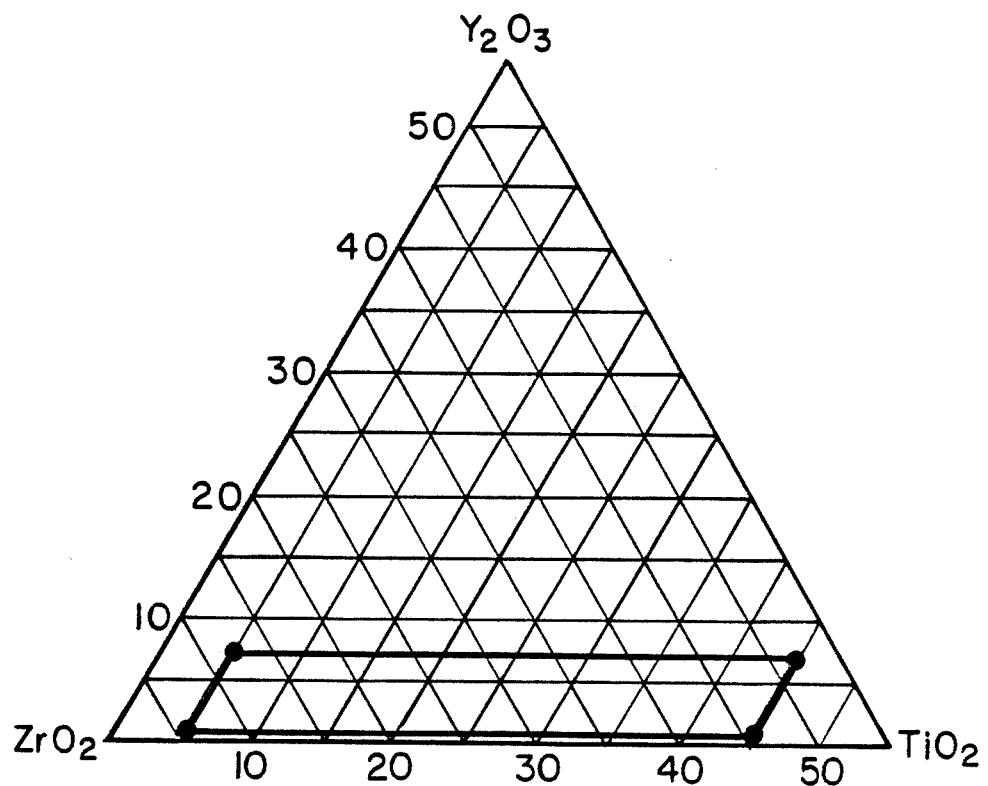
Figure 3:
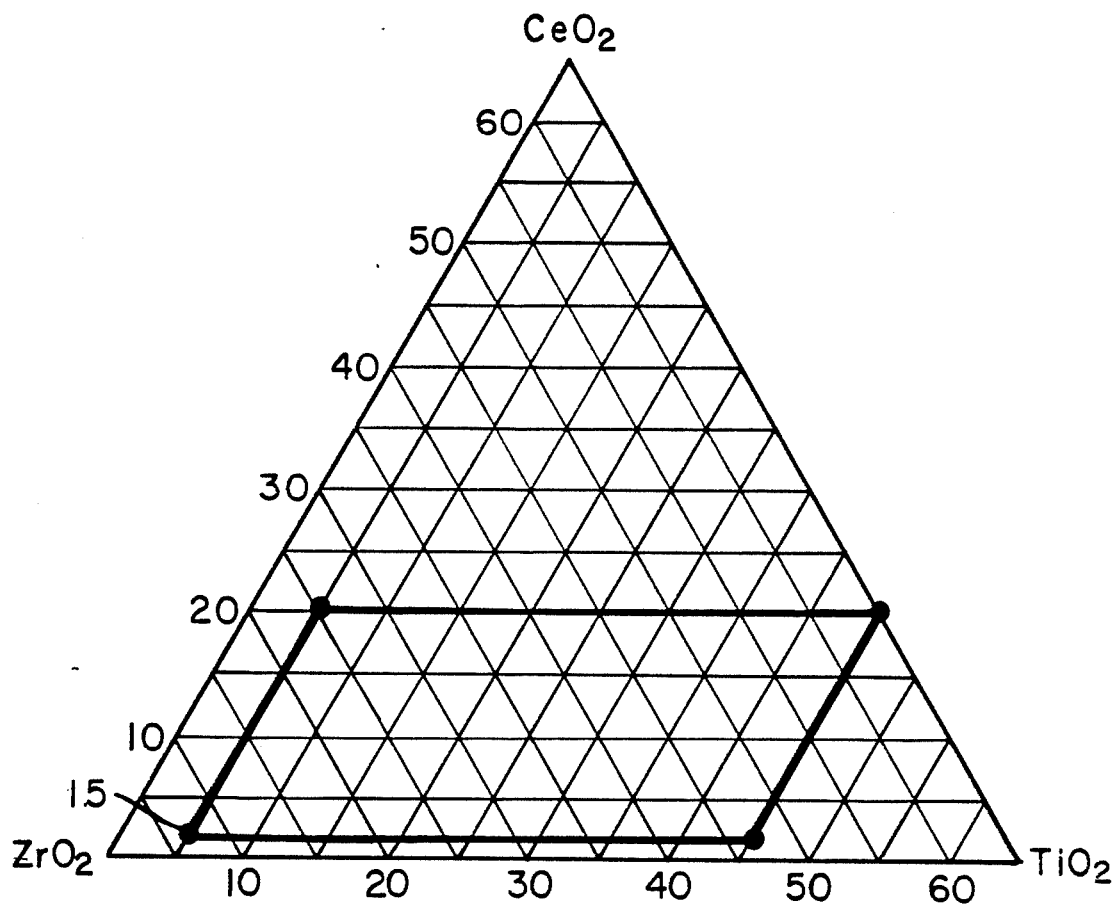

It is an object of this invention to provide a transformation toughened zirconia alloy with a minimum amount of stabilizer additive and decreased concentrations of zirconia which have improved ceramic compositions comprising:

a sintered, partially-stabilized ceramic alloy consisting essentially of 45 to 94.75 mole percent zirconia, 5 to 45 mole percent titania, and from about 0.25 to 10 mole percent rare earth oxides selected from the group consisting essentially of $Gd_2O_3$, $Yb_2O_3$, $Nd_2O_3$, $Dy_2O_3$, $Tb_2O_3$, $Ho_2O_3$, $Er_2O_3$, $Pr_2O_3$, and $Sm_2O_3$; (FIG. 1)

a sintered, partially-stabilized ceramic alloy consisting essentially of 48 to 94.75 mole percent zirconia, 5 to 45 mole percent titania, and 0.25 to 7 mole percent yttria; (FIG. 2)

a sintered, partially-stabilized ceramic alloy consisting essentially of 35 to 93.5 mole percent zirconia, 5 to 45 mole percent titania, and 1.5 to 20 mole percent ceria; (FIG. 3)

and mixtures of the above ceramic alloys.

The ceramic alloy consists of fine-grained crystals, i.e., less than 7 and commonly less than 4 microns in size, of mixed phases consisting essentially of tetragonal and monoclinic structures, or having a phase consisting essentially of tetragonal symmetry, with a minor amount of a cubic phase and/or a $ZrTiO_4$ phase.

The addition of moderate concentrations of yttria is known to "stabilize" the tetragonal crystal phase of zirconia when the grain size is small. Higher concentrations of yttria are needed to form the cubic plus tetragonal phases, while still higher concentrations of yttria result in a cubic crystalline structure. This stabilization is effected as the sample is cooled from its sintered temperature. The effect of lower concentrations of yttria is to inhibit the transformation reaction so that the crystal structure is a convenient mix of monoclinic and tetragonal phases or essentially a tetragonal phase. A disadvantage of yttria as a stabilizer is its cost and relative scarcity. Therefore, a need exists to inhibit the tetragonal to monoclinic transformation with a less costly and more abundant material.

The invention herein disclosed shows that titania may be mixed with zirconia and a significantly decreased amount of yttria to effect the desired zirconia mixed crystal structure. The titania-zirconia mixture by itself does not effect the desired hardness and toughness properties; a small amount of yttria or yttria-like material remains a requirement. The titania acts as a stabilizing aid to the proven stabilizer yttria.

The use of a stabilizing aid, such as titania, reduces the requirement for yttria to a minimal concentration. It further indicates that yttria and other "stabilizers", aliovalent dopants, that can prevent the tetragonal to monoclinic transformation can be replaced by compounds, such as titania, that do not produce oxygen vacancy defects, at least to the extent of the presence of aliovalent dopants (+2 and +3 cations).

Ceria has been known as a stabilizer for a long time and also does not produce large quantities of oxygen vacancies in zirconia. Titania acts similarly to ceria, though significant differences exist. Cerium +4 has an ionic radius that is much larger than zirconium +4 ion; in comparison, titanium +4 ion has an ionic radius that is much smaller than zirconium +4. This difference in cation size is reflected in differences in the phase diagrams of zirconia-ceria and zirconia-titania. Due to the small size of the titanium ion, the zirconia-titania system contains an additional intermediate compound of zirconium titanate at about 50 mole % titania.

It is well known in the art that the zirconia-yttria system requires grain sizes smaller than two microns in size to retain the tetragonal phase. Disclosed herein, the zirconia-titania system exhibits grain sizes between about 1 micron or less for zirconia- 2.5 mole % titania (at yttria concentrations of 0, 0.5, and 1 mole %) sintered at 1300° C. for two hours, and about 5 microns (with some grains as large as 7 microns) for zirconia-15 mole % titania (at yttria concentrations of 0, 0.5, and 1 mole %) sintered at 1500° C. for two hours. If densification can be achieved without excessive grain growth, compositions with about 15 mole % titania or less and about 1 mole % yttria or less may yield high toughness ceramic bodies at room temperature, wherein crystals having a tetragonal structure constitute the predominant phase. Coprecipitated powders, encapsulated hot isostatic pressing, use of a moderate amount of a glassy phase, uniaxially hot pressing, and grain growth inhibition techniques, alone or in addition to the above, may provide ceramic densification without excessive grain growth.

It is known in the art that small submicron grain sizes may be achieved by using a second phase, the cubic phase of $ZrO_2$, for example, to hinder the grain growth of the tetragonal phase. This grain growth inhibition allows retention of the tetragonal phase of zirconia at room temperature for yttria concentrations greater than 2 mole %. At lower concentrations of yttria, below about 1.4 mole % for example, no cubic zirconia is present in the zirconia-yttria system. However, at levels of about 20 mole % titania and above, a zirconium titanate ($ZrTiO_4$) type-phase is present in the $ZrO_2$-$TiO_2$ system. The zirconium titanate phase can be used as a second phase, similarly to the above cited cubic phase, to inhibit grain growth and maintain the tetragonal phase at room temperature. This intriguing substitution results in a tough ceramic alloy, particularly at levels of yttria lower than 1.4 mole % where no competing cubic phase grain growth inhibition has been observed. Therefore, at higher levels of yttria, about 1.4 mole % and greater, the cubic phase of zirconia can be used to inhibit grain growth in the $ZrO_2$-$TiO_2$-$Y_2O_3$ system. At concentrations of yttria from 1.4 to about 7 mole % yttria and from 20 to about 45 mole % titania, both the zirconium titanate phase and the cubic phase of zirconia cooperate to hinder the grain growth of the tetragonal phase. At yttria concentrations below about 1.4 mole % and titania concentrations greater than about 20 mole %, the grain growth inhibition is attributed to the presence of zirconium titanate. At low concentrations of yttria (below 1.4 mole percent), 5–20 mole percent titania, the remainder zirconia, the ceramic alloy can be useful for toughening ceramic matrix materials, i.e., $Al_2O_3$-$ZrO_2(TiO_2$-$Y_2O_3(RE_2O_3))$ or mullite ($3Al_2O_3$-$2SiO_2$)-$ZrO_2(TiO_2/Y_2O_3$ $(RE_2O_3))$. $ZrO_2$-5 mole percent $TiO_2$ to 20 mole percent $TiO_2$ without $Y_2O_3$ or $Re_2O_3$ may be useful for ceramic matrix toughening as well.

The inventive ceramic compositions are effective in producing tough composite bodies containing refractory fibers and/or whiskers. In general, the fibers and/or whiskers may comprise up to 80% by volume of the product. $Al_2O_3$, silicon oxycarbide, mullite, spinel, sialon, silicon nitride, AlN, $B_4C$, BN, zircon, and SiC are illustrative of useful fibers and whiskers.

The inventive ceramic compositions are also very useful in enhancing the toughness of hard, refractory ceramics. As little as 5% by volume of these alloys can impart substantial improved toughness. The ceramic matrix may comprise up to 95% by volume of the product. Examples of such ceramic matrices include α-alumina, β-alumina, β"-alumina, $Al_2O_3$-$Cr_2O_3$ solid solutions, mullite, sialon, nasicon, silicon carbide, silicon nitride, spivel, titanium carbide, titanium diboride, Al-mullite/Cr-mullite solid solutions, zircon and zirconium carbide.

Whereas the above description has been drawn to shaped bodies produced through such means as sintering, it will be recognized that the term bodies includes such variants as beads, coatings, fibers, honeycombs, and sheets fabricated utilizing the wide variety of methods known to the art, including, but not limited to hot pressing, arc melting, chemical vapor depositions, extrusion, plasma spraying, skull melting, and zone melting. For example, the hardness and toughness exhibited by the inventive materials strongly recommend their utility as abrasion resistant and thermal barrier coatings.

It is further found that titania concentrations can be increased and zirconia concentrations decreased with small loss in the desired toughness and hardness properties.

A further benefit of the titania stabilizing aid is that rare earth oxides such as gadolinia, ytterbia, ceria, and neodymia may be substituted for yttria in the alloy with equal effect.

The discovery of a stabilizing aid in the stabilization of the tetragonal phase of zirconia provides a new tool to gain scientific insights into the stabilization and transformation mechanisms and produces a new useful material with desirable thermal insulating, electrical insulating, hardness and toughness properties.

Table 1 lists compositions examined with the resultant hardness and toughness data exhibited by these respective compositions. The specified mole % amounts of zirconia and titania powders were mixed together by ball milling in 250 ml nalgene bottles utilizing 45$ZrO_2$ balls of 0.5" diameter as the milling media. Isopropyl Alcohol (IPA) was added to cover the powder and milling media. The combination was placed in vibramill canisters and milled for approximately 60 hours. The mixture was then poured into PYREX ® brand drying dishes and air dried in a 320° F. oven.

After drying, the powders were poured into alumina crucibles, partially covered and calcined in air at 700° C. for 2 hours. The powders were then combined with one of the following nitrate salts, yttrium, cerium, lanthanum, neodymium, gadolinium, or ytterbium dissolved in enough methanol to be able to make a slurry when added to the $ZrO_2$-$TiO_2$ powder, and mixed well.

These compositions were then dried, calcined, and vibramilled for 24 hours. After milling, the completely dried powders were scalped through a nylon screen and pressed into pills. The pills were first uniaxially pressed to 1000 psi in a ½ inch diameter die in a Carver press, and, after being placed in isostatic pressing bags, were isostatically pressed to 45 Kpsi and held at that pressure for ten minutes. One pill of each composition was fired at 1300°, 1400°, and 1500° C. for two hours in air or vacuum and examined for completeness of sintering.

The sintered specimens were ground and polished, and microhardness tested utilizing a 10 kilogram load. E was assumed to be 200 GPa unless the measured hardness was lower than 7 GPa. Under that circumstance, the elastic modulus was assumed to be 200 GPa, multiplied by the measured hardness and divided by 11 GPa. This rationale assumes the modulus decreases in proportion to the hardness. The elastic modulus will decrease with porosity and microcracking which is reflected in a large decrease in the hardness.

$K_{IC}$ and H were calculated from the following equations:

$$K_{IC} = 0.016(E^{\frac{1}{2}}P^{\frac{1}{2}}dC^{-1.5})$$

wherein

E = 200 GPa; P = load of 10 kg;
d = indent diagonal; C = crack length from center of indent impression;
H = Hardness; and $H = 1.854P/d^2$

TABLE 1

| Sample | Composition $ZrO_2$— | Sintering Temperature °C. | H GPa | $K_{IC}$ MPa m |
|---|---|---|---|---|
| A | 2.5 m % $TiO_2$ | 1300° C. | Porous | |
| | " | 1400° C. | microcracked | |
| | " | 1500° C. | " | |
| B | 5 m % $TiO_2$ | 1300° C. | Porous | |
| | " | 1400° C. | microcracked | |
| | " | 1500° C. | " | |
| C | 15 m % $TiO_2$ | 1300° C. | microcracked | |
| | " | 1400° C. | " | |
| | " | 1500° C. | " | |
| D | 35 m % $TiO_2$ | 1300° C. | microcracked | |
| | " | 1400° C. | " | |
| | " | 1500° C. | " | |
| E | 2.5 m % $TiO_2$—0.5 m % $Y_2O_3$ | 1300° C. | Porous | |
| | " | 1400° C. | microcracked | |
| | " | 1500° C. | " | |
| F | 5 m % $TiO_2$—0.5 m % $Y_2O_3$ | 1300° C. | Porous | |
| | " | 1400° C. | microcracked | |
| | " | 1500° C. | " | |
| G | 15 m % $TiO_2$—0.5 m % $Y_2O_3$ | 1300° C. | microcracked | |
| | " | 1400° C. | " | |
| | " | 1500° C. | microcracked | |
| H | 35 m % $TiO_2$—0.5 m % $Y_2O_3$ | 1300° C. | 8.0 | 4.7 |
| | " | 1400° C. | 8.0 | 5.2 |
| | " | 1500° C. | 7.8 | 4.4 |
| I | 2.5 m % $TiO_2$—1.0 m % $Y_2O_3$ | 1300° C. | Porous | |
| | " | 1400° C. | microcracked | |
| | " | 1500° C. | " | |
| J | 15 m % $TiO_2$—1.0 m % $Y_2O_3$ | 1300° C. | Porous | |
| | " | 1400° C. | microcracked | |
| | " | 1500° C. | — | |
| K | 15 m % $TiO_2$—1.0% $Y_2O_3$ | 1300° C. | microcracked | |
| | " | 1400° C. | " | |
| | " | 1500° C. | " | |
| L | 35 m % $TiO_2$—1.0 m % $Y_2O_3$ | 1300° C. | 8.2 | 5.2 |
| | " | 1400° C. | 8.5 | 4.8 |
| | " | 1500° C. | 8.9 | 4.3 |
| M | 20 m % $TiO_2$—0.5 m % $Y_2O_3$ | 1300° C. | Porous | |
| | " | 1400° C. | microcracked | |
| | " | 1500° C. | " | |
| N | 30 m % $TiO_2$—0.5 m % $Y_2O_3$ | 1300° C. | Porous | |
| | " | 1400° C. | 8.4 | 6.9 |
| | " | 1500° C. | 9.6 | 4.9 |
| O | 40 m % $TiO_2$—0.5 m % $Y_2O_3$ | 1300° C. | Porous | |
| | " | 1400° C. | 8.9 | 3.4 |
| | " | 1500° C. | 11.6 | 3.3 |
| P | 25 m % $TiO_2$—1.0 m % $Y_2O_3$ | 1300° C. | 8.3 | 6.2 |
| | " | 1400° C. | 9.8 | 5.8 |
| | " | 1500° C. | 8.8 | 6.5 |
| Q | 45 m % $TiO_2$—1.0 m % $Y_2O_3$ | 1300° C. | 7.8 | 4.4 |
| | " | 1400° C. | 10.0 | 1.7 |
| | " | 1500° C. | 11.2 | 2.4 |
| R | 35 m % $TiO_2$—1.0 m % $CeO_2$ | 1300° C. | Porous | |
| | " | 1400° C. | microcracked | |
| | " | 1500° C. | " | |
| S | 35 m % $TiO_2$—2.0 m % $CeO_2$ | 1300° C. | Porous | |
| | " | 1400° C. | 10.3 | 6.2 |
| | " | 1500° C. | microcracked | |
| T | 35 m % $TiO_2$—4.0 m % $CeO_2$ | 1300° C. | 8.6 | 2.6 |
| | " | 1400° C. | 8.6 | 3.5 |
| | " | 1500° C. | 8.2 | 6.5 |
| U | 35 m % $TiO_2$—1.0 m $La_2O_3$ | 1300° C. | Porous | |
| | " | 1400° C. | microcracked | |
| | " | 1500° C. | " | |
| V | 35 m % $TiO_2$—1.0 m % $Nd_2O_3$ | 1300° C. | 8.1 | 4.6 |
| | " | 1400° C. | 5.9 | 4.8 |

TABLE 1-continued

| Sample | Composition ZrO$_2$— | Sintering Temperature °C. | H GPa | K$_{IC}$ MPa m |
|---|---|---|---|---|
| | " | 1500° C. | (beginning to microcrack) microcracked | |
| W | 35 m % TiO$_2$—1.0 m LaNdO$_3$ | 1300° C. | 5.0 | 4.6 |
| | " | 1400° C. | microcracked | |
| | " | 1500° C. | " | |
| X | 35 m % TiO$_2$—0.5 m % YbGdO$_3$ | 1300° C. | 5.6 | 4.5 |
| | " | 1400° C. | 10.0 | 4.8 |
| | " | 1500° C. | 9.3 | 5.1 |

The hardness and toughness results shown in Table 1 indicate that reasonably good values for hardness and toughness can be obtained for Y$_2$O$_3$ compositions of approximately 0.5 mole %. As the titania mole % decreases at a constant Y$_2$O$_3$ mole %, the toughness values improve significantly. Changes in both yttria and titania concentrations control both zirconia-titania-yttria hardness and toughness values. Significant changes in hardness and toughness values are made with small changes in Y$_2$O$_3$ and rare earth oxides, while much larger changes can be made in the titania concentration.

The values for hardness ranged from 5.6 to 11.6. The highest values were found at 0.5 mole % Y$_2$O$_3$ and 40 mole % titania. Comparable hardness values were found at 1.0 mole % Y$_2$O$_3$ and 45 mole % titania.

Toughness values did not follow the same trend since the lowest toughness values were observed at high titania and low yttria concentrations. It is speculated that this phenomenon is caused by the formation of zirconium titanates. As a result, it is conjectured that a minimum combination of titania and yttria and/or rare earth oxide combinations may be needed to provide a material with acceptable hardness and toughness values.

The composition toughness and hardness values are not significantly sensitive to any one temperature within the 300° C. temperature range used for densification. While generally tougher and harder materials were made at the higher sintering temperatures, adequate materials were made at all temperatures investigated with a minimum temperature of 1300° C. needed to assume sufficient sintering.

X-ray diffraction, scanning electron microscopy (SEM), and optical microscopy revealed the presence of a tetragonal zirconia solid solution, some monoclinic zirconia solid solution, a ZrTiO$_4$ type phase (increasing in volume fraction from ZrO$_2$-25 mole % TiO$_2$ with yttria to ZrO$_2$-40 mole % TiO$_2$ with yttria), and grain sizes from substantially submicron to about 4 microns for whole intact bodies. SEM micrographs of fracture surfaces indicate at least some grains fracture across the grain rather than along the grain boundaries, as in the zirconia yttria system. These fractured grains are very rough, exhibiting structures somewhat like multiple cleavage planes or twins. The volume fraction of these grains increases with the decrease in the ZrTiO$_4$-type phase. The phase that fractures across the grains in a very rough manner is apparently the tetragonal (monoclinic) phase.

Hafnium oxide is often present as an impurity in zirconia; as a result hafnium oxide-zirconia solid solutions may be present in the alloy admixture.

Two composition areas constitute the preferred embodiments of the invention:

first, compositions consisting essentially, expressed in terms of mole percent on the oxide basis, of 0.5–4% Y$_2$O$_3$ or a rare earth oxide, 22–45% TiO$_2$, and 51–77.5% ZrO$_2$, with the most preferred region within that area consisting essentially of 0.5–3% Y$_2$O$_3$, 25–40% TiO$_2$, and 57–74.5% ZrO$_2$; and second, compositions consisting essentially, expressed in terms of mole percent on the oxide basis, of 1.5–16% CeO$_2$, 22–45% TiO$_2$, and 39–76.5% ZrO$_2$, with the most preferred region within that area consisting essentially of 1.5–8% CeO$_2$, 25–40% TiO$_2$, and 52–73.5% ZrO$_2$.

The advantage of the disclosed invention lies in the surprising hardness and toughness values exhibited by these compositions in which titania performs as an adequate substitute for a portion of the stabilizer yttria and actually replaces part of the ceramic composition base zirconia. Titania aids in the stabilization of the zirconia tetragonal phase, while decreasing the required high concentrations of yttria and zirconia. Such a substitution results in a hard and tough material at a more reasonable cost.

I claim:

1. An improved ceramic composition consisting essentially of a sintered partially stabilized ZrO$_2$ ceramic alloy whose composition is selected from:
   (a) composition A consisting essentially of a sintered ceramic alloy consisting essentially of 45 to 94.75 mole percent zirconia, 5 to 45 mole percent titania, and 0.25 to 10 mole percent rare earth oxide selected from the group consisting of Gd$_2$O$_3$, Yb$_2$O$_3$, Nd$_2$O$_3$, Tb$_2$O$_3$, Pr$_2$O$_3$, Dy$_2$O$_3$, Ho$_2$O$_3$, Sm$_2$O$_3$, and Er$_2$O$_3$,
   (b) composition B consisting essentially of a sintered ceramic alloy consisting essentially of 48 to 94.75 mole percent zirconia, 5 to 45 mole percent titania and 0.25 to 7 mole percent yttria, and
   (c) composition C consisting essentially of a sintered ceramic alloy consisting essentially of 35 to 93.5 mole percent zirconia, 5 to 45 mole percent titania, and 1.5 to 20 mole % ceria.

2. The composition as defined in claim 1 wherein the selected composition is composition A.

3. The composition as defined in claim 1 wherein the selected composition is composition B.

4. The composition as defined in claim 1 wherein the selected composition is composition C.

5. A ceramic composition of claim 1 consisting of fine grain size crystals less than 4 microns in size.

6. A ceramic composition of claim 2 consisting essentially of 0.5 to 4.0 mole percent rare earth oxide selected from the group consisting of Gd$_2$O$_3$, Yb$_2$O$_3$, Nd$_2$O$_3$, Dy$_2$O$_3$, Ho$_2$O$_3$, Pr$_2$O$_3$, Sm$_2$O$_3$, Tb$_2$O$_3$ and Er$_2$O$_3$.

7. An improved ceramic composition consisting essentially of a sintered partially-stabilized ceramic alloy having a composition consisting essentially of 0.5 to 4.0 mole percent yttria or a rare earth oxide, 22 to 45 mole percent titania, and 51 to 77.5 mole percent zirconia.

8. A ceramic composition of claim 4 consisting essentially of 1.5 to 16 mole percent ceria, 22 to 45 mole percent titania, and 39 to 76.5 mole percent zirconia.

9. A ceramic composition of claim 2 consisting essentially of 0.5 to 3.0 mole percent rare earth oxide selected from the group of $Gd_2O_3$, $Yb_2O_3$, $Nd_2O_3$, $Pr_2O_3$, $Tb_2O_3$, $Ho_2O_3$, $Sm_2O_3$, $Dy_2O_3$ and $Er_2O_3$.

10. A ceramic composition of claim 3 consisting essentially of 0.5 to 3.0 mole percent of yttria, 25 to 40 mole percent titania, and 57 to 74.5 mole percent zirconia.

11. A ceramic composition of claim 4 consisting essentially of 1.5 to 8 mole percent ceria, 25 to 40 mole percent titania, and 52 to 73.5 mole percent zirconia.

12. A ceramic body consisting essentially of at least 5% by volume of a ceramic alloy according to claim 1 with a remainder being a hard refractory ceramic selected from the group consisting of $\alpha$-alumina, $\beta$-alumina, $\beta'$-alumina, $Al_2O_3$-$Cr_2O_3$ solid solution, mullite, sialon, nasicon, silicon carbide, silicon nitride, spinel, titanium carbide, titanium diboride, zircon, and zirconium carbide.

13. A ceramic composite body consisting essentially of up to 80% by volume refractory ceramic fibers and/or whiskers selected from the group consisting of alumina, mullite, sialon, silicon carbide, silicon nitride, AlN, BN, $B_4C$, zircon, silicon oxycarbide, and spinel and at least 5% by volume of a ceramic alloy according to claim 1.

14. A ceramic composition of claim 1 wherein the predominant crystal phases present are tetragonal or monoclinic or a combination thereof.

* * * * *

UNITED STATES PATENT AND TRADEMARK OFFICE
CERTIFICATE OF CORRECTION

PATENT NO. : 4,753,902
DATED      : June 28, 1988
INVENTOR(S) : Thomas D. Ketcham It is certified that error appears in the above-identified patent and that said Letters Patent is hereby corrected as shown below:

Column 3, line 65, change "$(RE2O_3))$" to --$(RE_2O_3))$--.

Column 3, line 67, change "$Re_2O_3$" to --$RE_2O_3$--.

Column 4, line 16, change "spivel" to --spinel--.

Column 4, line 48, change "$45ZrO_2$" to --$45\ ZrO_2$--.

Column 8, line 35, change "partially stabilized" to --partially-stabilized--.

Column 10, line 2, change "$\beta'$" to --$\bar{\beta}''$--.

Signed and Sealed this

Twenty-fourth Day of October, 1989

Attest:

DONALD J. QUIGG

*Attesting Officer*  *Commissioner of Patents and Trademarks*